Patented Apr. 20, 1926.

1,581,572

UNITED STATES PATENT OFFICE.

HERMANN FRITZSCHE, HANS GUBLER, AND FRITZ STRAUB, OF BASEL, SWITZERLAND, ASSIGNORS TO THE SOCIETY OF CHEMICAL INDUSTRY IN BASLE, OF BASEL, SWITZERLAND.

ACID AZO DYESTUFFS FOR WOOL CONTAINING CHROMIUM AND PROCESS FOR THE MANUFACTURE OF SAME.

No Drawing. Application filed October 15, 1923. Serial No. 668,764.

*To all whom it may concern:*

Be it known that we, HERMANN FRITZSCHE, HANS GUBLER, and FRITZ STRAUB, all citizens of the Swiss Republic, and residing at Basel, Switzerland, have invented new and useful Acid Azo Dyestuffs for Wool Containing Chromium and Process for the Manufacture of Same, of which the following is a full, clear, and exact specification.

The present invention relates to dyestuffs containing chromium which form valuable acid azo coloring matters for wool. It comprises the production of the dyestuffs, the dyestuffs themselves, as well as the dyed fabrics or other materials, dyed with the new dyestuffs.

It has been found that by combining diazotized aromatic ortho-hydroxy-diazo-compounds which contain no nitro-groups, with amino-compounds of the naphthalene series which are capable of being coupled in ortho-position to the amino-group, new dyestuffs are obtained. These dyestuffs however, are of no value as such or as mordant dyestuffs, but they will yield valuable acid dyestuffs when treated with agents adapted to yield chromium.

The new acid azo dyestuffs for wool are therefore the complex chromium compounds of the dyestuffs of the general formula: R—N=N—R′ wherein R signifies a hydroxylated aromatic nucleus which contains no nitro-group, and in which the azo-bridge adheres to an ortho-position in respect of the hydroxyl-group, and R′ an aminonaphthalene-compound in which the azo-bridge adheres to an ortho-position in respect of the amino-group. They form blackish powders, the aqueous solutions of which in a thin layer appear blue and in a thicker layer violet. They dye wool in an acid bath blue-green to deep olive-green tints of excellent fastness. They differ from the products obtained from nitrated diazo compounds by better properties, especially enhanced fastness to milling.

It has been found that the azo-dyestuffs in question can be made in such manner that one molecule of the diazo-compound is caused to react on one molecule of the amine.

It has further been found that by coupling β-naphthylamine it is advantageous to employ two molecules of β-naphthylamine for the one molecule of an ortho-hydroxy-diazo-compound. There is thus formed in excellent yield a double compound of one molecular proportion of β-naphthylamine with one molecular proportion of the resulting ortho-hydroxy-ortho-amino-azo-dyestuff, which compound can easily and with quantitative yield be split into its constituents, for example heating them with alkalies. There are thus obtained easily and with excellent yield the coupling products which otherwise would be obtained only with moderate yield.

Example 1.

189 parts of 2-amino-1-phenol-4-sulfonic acid are diazotized in the usual manner. The diazo solution is carefully neutralized with sodium carbonate and added, with constant stirring, to a hot aqueous solution of 359 parts of β-naphthylamine hydrochloride. Stirring is continued at higher temperature, for instance between 40–85° C. until coupling is complete. The crystalline reaction product which separates, consisting of a double compound of the ortho-amino-azo-dyestuff and β-naphthylamine, is treated with cold caustic soda solution. The β-naphthylamine is thus eliminated and, after filtration, an orange solution is obtained from which the pure ortho-amino-azo-dyestuff may be separated by salting out. It dissolves in water to an orange solution, and dyes wool in an acid bath orange tints which by after-chroming become green.

35 parts of this dyestuff are dissolved in 350 parts of boiling water. The solution is mixed with a solution of chromium formate corresponding with 11.4 parts of $Cr_2O_3$, and the mixture is boiled for a long time in a reflux apparatus. It is then in part evaporated and the chromium compound is salted out by adding common salt. When dried it forms a dark powder, the aqueous solutions of which in a thin layer appear blue and in a thicker layer violet. It dyes wool in an acid bath full deep green tints. By using another agent adapted to yield chromium, such as for instance, chromium acetate, chromium fluoride, or hydrated chromium hydroxide, like dyestuffs are obtained.

*Example 2.*

224.5 parts of 4-chloro-2-amino-1-phenol-5-sulfonic acid are diazotized in the usual manner; the neutralized diazo-solution is introduced into a hot and concentrated solution of 245 parts of the sodium salt of 1-aminonaphthalene-4-sulfonic acid. The mixture is stirred at a raised temperature (between 50 and 100° C.) until coupling is complete; it is then diluted with water and the dyestuff is salted out by means of common salt. This dyestuff dissolves in water to a yellowish-red solution and dyes wool in an acid bath red-orange.

46.6 parts of this dyestuff are dissolved in 800 parts of boiling water; the solution is mixed with an excess of a freshly precipitated paste of hydrated chromium hydroxide and the mixture is boiled for a long time in a reflux apparatus. The unaltered hydrated chromium hydroxide is filtered and the clear filtrate evaporated to dryness. The chromium compound thus obtained forms a dark powder, the aqueous solutions of which in a thin layer appear blue and in a thicker layer violet. It dyes wool in an acid bath deep, covered, blue-green tints.

The following table shows the main properties of some of the dyestuffs and chromium compounds obtainable according to the invention:—

| Diazo-component. | β- or α-naphthylamine derivative. | Azo-dyestuff. | | Chromium-compound—color of wool dyed in acid bath. |
| --- | --- | --- | --- | --- |
| | | Color of the aqueous solution. | Color of wool dyed in acid bath. | |
| I. 4-chloro-2-amino-1-phenol | 2-aminonaphthalene-6-sulfonic acid | Orange | Reddish-yellow | Dark-green |
| II. 4-chloro-2-amino-1-phenol | 2-aminonaphthalene-5.7-disulfonic acid | Orange | Orange | Dark-green |
| III. 4-chloro-2-amino-1-phenol-5-sulfonic acid. | ω-methanesulfonic acid of β-naphthylamine. | Reddish-orange | Yellow-red | Blue-green |
| IV. 2-amino-1-phenol-4-sulfonic acid | β-naphthylamine | Orange | Orange | Dark-green |
| V. 4-chloro-2-amino-1-phenol-5-sulfonic acid. | β-naphthylamine | Orange | Orange | Blue-green |
| VI. 4-methyl-2-amino-1-phenol-5-sulfonic acid. | β-naphthylamine | Orange | Orange | Dark-green |
| VII. 4-chloro-2-amino-1-phenol-5-sulfonic acid. | 1-aminonaphthalene-4-sulfonic acid | Orange | Orange | Dark-green |

The formula of the dyestuff No. I is:

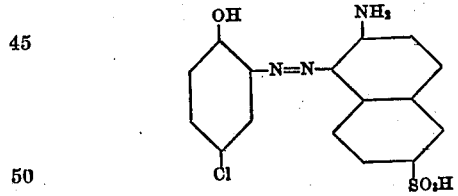

The formula of the dyestuff No. II is:

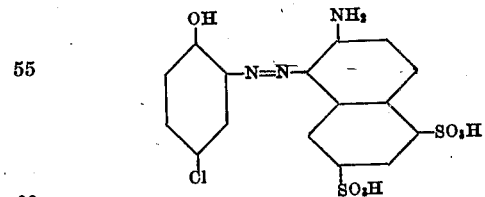

The formula of the dyestuff No. IV is:

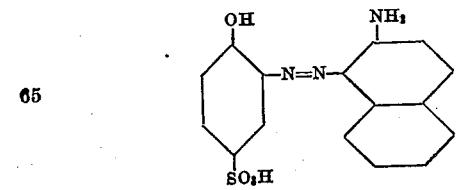

The formula of the dyestuff No. VII is:

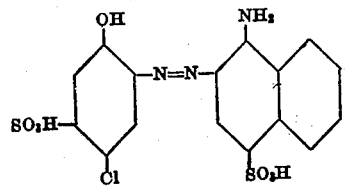

What we claim is:—

1. As a new process the herein described manufacture of new acid azo dyestuffs for wool containing chromium, which consists in coupling the diazo-compounds of aromatic ortho-hydroxy-amino-compounds which contain no nitro-groups, with amino-compounds of the naphthalene series which are capable of being coupled in ortho-position to the amino-group, and then treating the dyestuffs thus obtained with trivalent compounds of chromium.

2. As a new process the herein described manufacture of new acid azo dyestuffs for wool containing chromium, which consists in coupling the diazo-compounds of aromatic ortho-hydroxy-amino-compounds which contain no nitro-groups, with β-naphthylamine compounds and then treating the dyestuffs thus obtained with trivalent compounds of chromium.

3. As a new process the herein described manufacture of new acid azo dyestuffs for wool containing chromium, which consists in coupling the diazo-compounds of sulfonated aromatic ortho-hydroxy-amino-compounds which contain no nitro-groups, with β-naphthylamine compounds, and then treating the dyestuffs thus obtained with trivalent compounds of chromium.

4. As a new process the herein described manufacture of new acid azo dyestuffs for wool containing chromium, which consists in coupling the diazo-compounds of sulfonated aromatic ortho-hydroxy-amino-compounds which contain no nitro-groups, with β-naphthylamine, and then treating the dyestuffs thus obtained with trivalent compounds of chromium.

5. As a new process the herein described manufacture of new acid azo dyestuffs for wool containing chromium, which consists in coupling one molecule of the diazo-compound of a sulfonated aromatic ortho-hydroxy-amino-compound which contains no nitro-groups, with two molecules of β-naphthylamine, then eliminating the β-naphthylamine from the obtained double compound of the azo-dyestuff and β-naphthylamine, and finally treating the dyestuff thus obtained with trivalent compounds of chromium.

6. As a new process the herein described manufacture of new acid azo dyestuffs for wool containing chromium, which consists in coupling one molecule of the diazo-compound of an ortho-aminophenolsulfonic acid with two molecules of β-naphthylamine, then eliminating the β-naphthylamine from the obtained double compound of the azo-dyestuff and β-naphthylamine, and finally treating the dyestuff thus obtained with trivalent compounds of chromium.

7. As a new process the herein described manufacture of new acid azo dyestuffs for wool containing chromium, which consists in coupling one molecule of the diazo-compound of the 1-hydroxybenzene-2-amino-4-sulfonic acid with two molecules of β-naphthylamine, then eliminating the β-naphthylamine from the obtained double compound of the azo-dyestuff and β-naphthylamine, and finally treating the dyestuff thus obtained with trivalent compounds of chromium.

8. As new products the herein described acid azo dyestuffs for wool which are the complex chromium compounds of the azo dyestuffs of the general formula R—N=N—R' wherein R signifies a hydroxylated aromatic nucleus which contains no nitro-groups, and in which the azo-bridge adheres to an ortho-position in respect of the OH-group, and R' an amino-naphthalene compound in which the azo-bridge adheres to an ortho-position in respect of the amino-group, which compounds form blackish powders, the aqueous solutions of which in a thin layer appear blue and in a thicker layer violet, and which dye wool in an acid bath blue-green to deep olive-green tints of excellent fastness.

9. As new products the herein described acid azo dyestuffs for wool which are the complex chromium compounds of the azo dyestuffs of the general formula R—N=N—R' wherein R signifies a hydroxylated aromatic nucleus which contains no nitro-groups, and in which the azo-bridge adheres to an ortho-position in respect of the OH-group, and R' a 2-amino-naphthalene compound in which the azo-bridge adheres to position-1, which compounds form blackish powders, the aqueous solutions of which in a thin layer appear blue and in a thicker layer violet, and which dye wool in an acid bath blue-green to deep olive-green tints of excellent fastness.

10. As new products the herein described acid azo dyestuffs for wool which are the complex chromium compounds of the azo dyestuffs of the general formula R—N=N—R' wherein R signifies a hydroxylated and sulfonated aromatic nucleus which contains no nitro-groups, and in which the azo-bridge adheres to an ortho-position in respect of the OH-group, and R' a 2-amino-naphthalene compound in which the azo-bridge adheres to position-1, which compounds form blackish powders, the aqueous solutions of which in a thin layer appear blue and in a thicker layer violet, and which dye wool in an acid bath blue-green to deep olive-green tints of excellent fastness.

11. As new products the herein described acid azo dyestuffs for wool which are the complex chromium compounds of the azo dyestuffs of the general formula R—N=N—R' wherein R signifies a hydroxylated and sulfonated aromatic nucleus which contains no nitro-groups, and in which the azo-bridge adheres to an ortho-position in respect of the OH-group, and R' an unsulfonated 2-amino-naphthalene compound in which the azo-bridge adheres to position-1, which compounds form blackish powders, the aqueous solutions of which in a thin layer appear blue and in a thicker layer violet, and which dye wool in an acid bath blue-green to deep olive-green tints of excellent fastness.

12. As a new product the herein described acid azo dyestuff for wool which are the complex chromium compounds of the azo dyestuff of the formula:

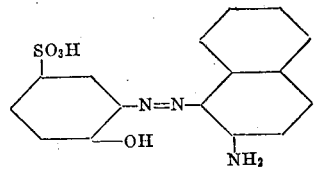

which compound forms a blackish powder, the aqueous solution of which in a thin layer appears blue and in a thicker layer violet, and which dyes wool in an acid bath a deep olive-green tint of excellent fastness.

In witness whereof we have hereunto signed our names this 4th day of October, 1923.

HERMANN FRITZSCHE.
HANS GUBLER.
FRITZ STRAUB.